US012067649B2

(12) United States Patent
Brennan (10) Patent No.: US 12,067,649 B2
(45) Date of Patent: Aug. 20, 2024

(54) PER-PIXEL VARIABLE RATE SHADING CONTROLS USING STENCIL DATA

(71) Applicant: Advanced Micro Devices, Inc., Santa Clara, CA (US)

(72) Inventor: Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 158 days.

(21) Appl. No.: 17/362,908

(22) Filed: Jun. 29, 2021

(65) Prior Publication Data

US 2022/0414950 A1 Dec. 29, 2022

(51) Int. Cl.
  *G06T 11/00* (2006.01)
  *G06T 1/20* (2006.01)

(52) U.S. Cl.
  CPC .............. *G06T 11/001* (2013.01); *G06T 1/20* (2013.01)

(58) Field of Classification Search
  None
  See application file for complete search history.

(56) References Cited

U.S. PATENT DOCUMENTS

| | | | |
|---|---|---|---|
| 8,040,357 B1 | 10/2011 | Hutchins et al. | |
| 8,044,956 B1 | 10/2011 | Kilgard | |
| 9,569,886 B2 | 2/2017 | Akenine-Moller et al. | |
| 10,147,227 B2 | 12/2018 | Nevraev et al. | |
| 10,510,185 B2 | 12/2019 | Saleh et al. | |
| 11,138,786 B1 * | 10/2021 | Uhrenholt | G06T 1/20 |
| 2009/0102843 A1 | 4/2009 | Sloan et al. | |
| 2013/0328895 A1 * | 12/2013 | Sellers | G06T 1/20 |
| | | | 345/522 |
| 2016/0110837 A1 | 4/2016 | Sideris et al. | |
| 2017/0133283 A1 | 5/2017 | Kenworthy et al. | |
| 2017/0161940 A1 | 6/2017 | Liktor et al. | |
| 2017/0243395 A1 | 8/2017 | Vaidyanathan et al. | |
| 2017/0293995 A1 | 10/2017 | Saleh et al. | |
| 2018/0240268 A1 | 8/2018 | Nevraev et al. | |
| 2019/0005714 A1 * | 1/2019 | Fuller | G06T 15/005 |
| 2020/0202594 A1 * | 6/2020 | Saleh | G06T 11/40 |
| 2021/0383600 A1 * | 12/2021 | Uhrenholt | G06F 9/4843 |

\* cited by examiner

*Primary Examiner* — Sarah Le
(74) *Attorney, Agent, or Firm* — Volpe Koenig (57) ABSTRACT

A disclosed technique includes determining a plurality of per-pixel variable rate shading rates for a plurality of fragments; determining a coarse variable shading rate for a coarse variable rate shading area based on the plurality of per-pixel variable rate shading rates; and shading one or more fragments based on the plurality of fragments and based on the coarse variable shading rate.

20 Claims, 7 Drawing Sheets

PER-PIXEL VARIABLE RATE SHADING CONTROLS USING STENCIL DATA

BACKGROUND

Three-dimensional ("3D") graphics processing pipelines perform a series of steps to convert input geometry into a two-dimensional ("2D") image for display on a screen. Improvements to rendering performance are constantly being made.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes determining a plurality of per-pixel variable rate shading rates for a plurality of fragments; determining a coarse variable shading rate for a coarse variable rate shading area based on the plurality of per-pixel variable rate shading rates; and shading one or more fragments based on the plurality of fragments and based on the coarse variable shading rate.

Figure 1:
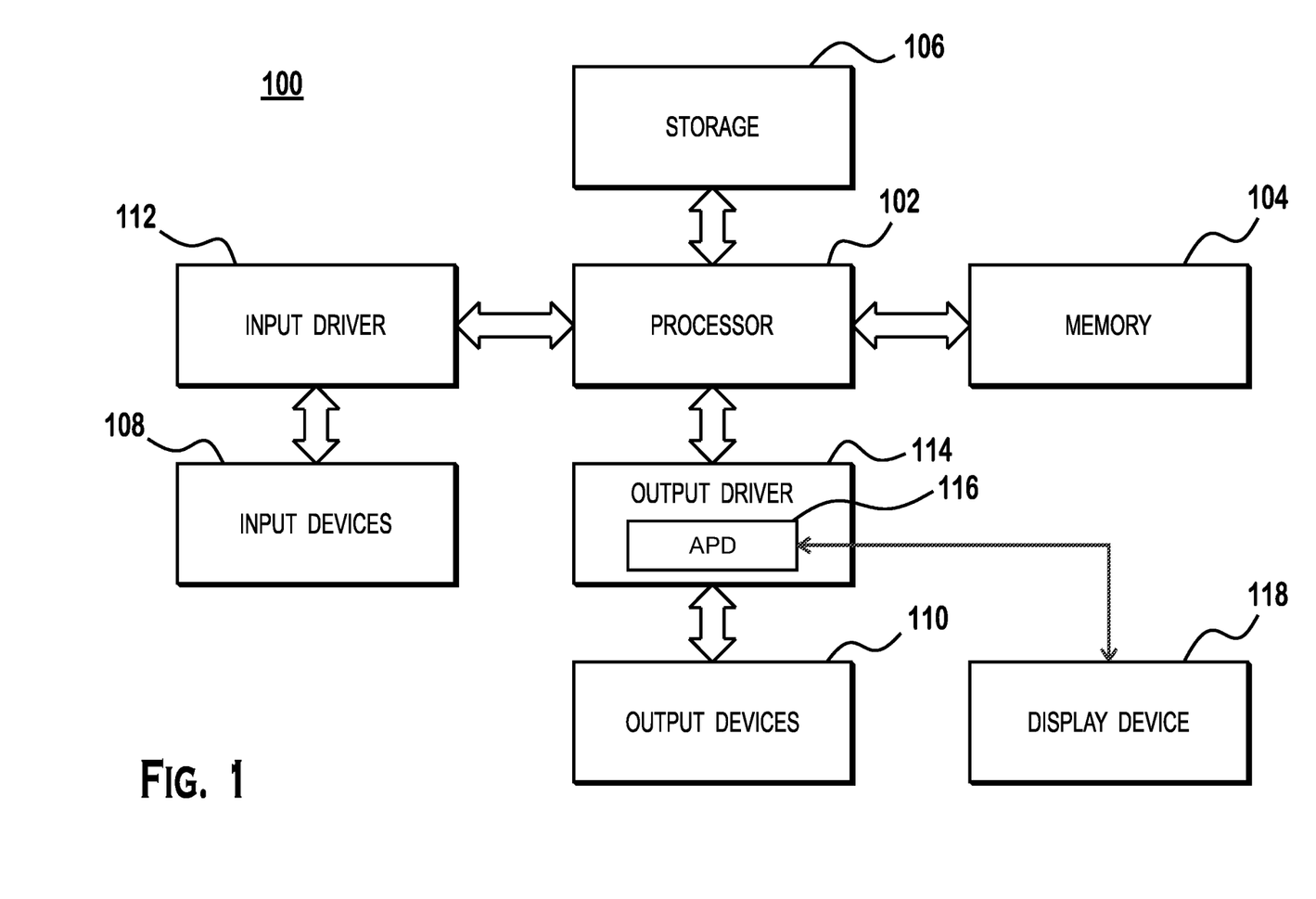
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
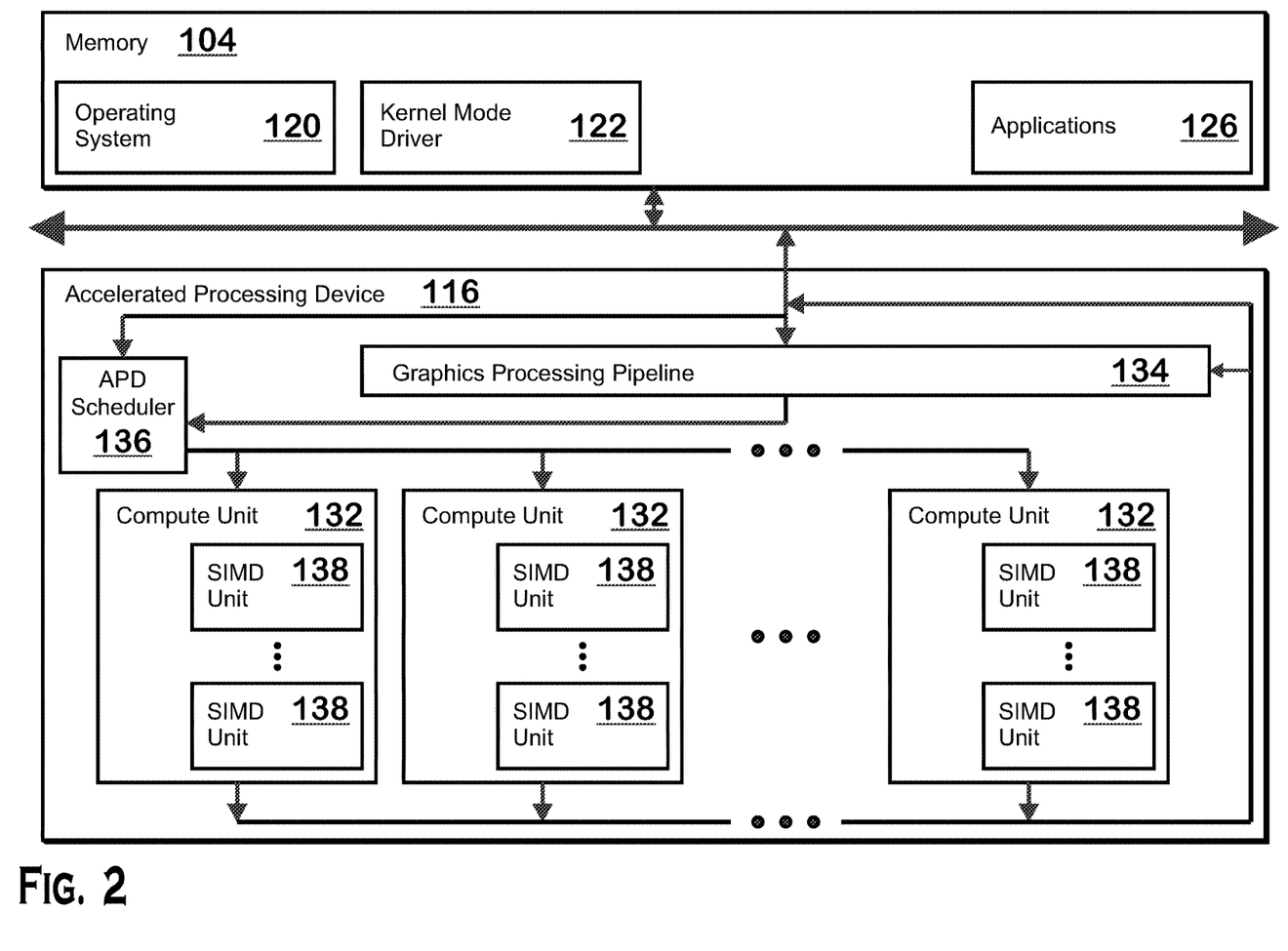
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
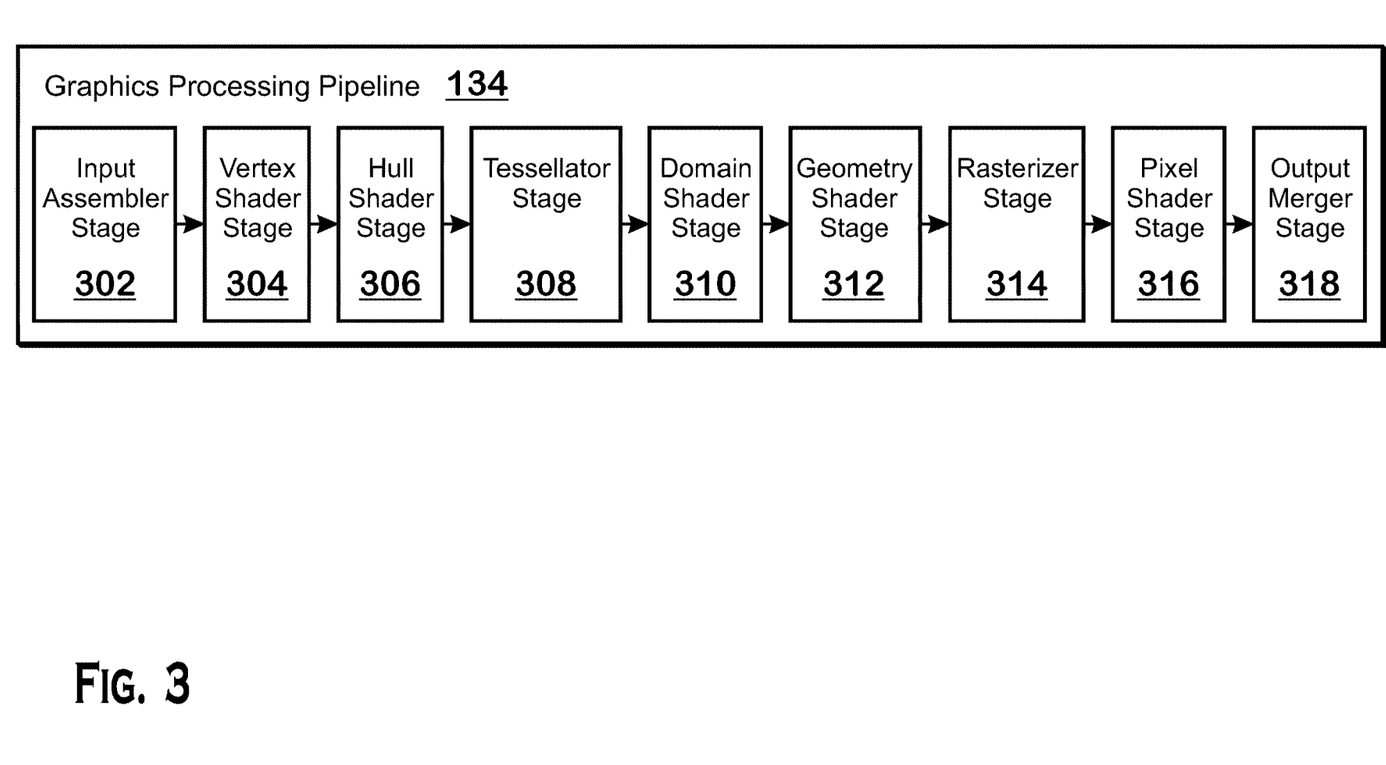
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

The graphics processing pipeline 134 is capable of performing rendering operations in a mode referred to as variable rate shading. In variable rate shading, each pixel shader work-item is capable of performing a shading operation to determine color for multiple render target pixels. Without variable rate shading, each work-item generates a color for at most one render target pixel. The "render target" is the ultimate destination for the results of the render operations. An example render target is the frame buffer, which stores pixel data for output to a screen.

Figure 4A:
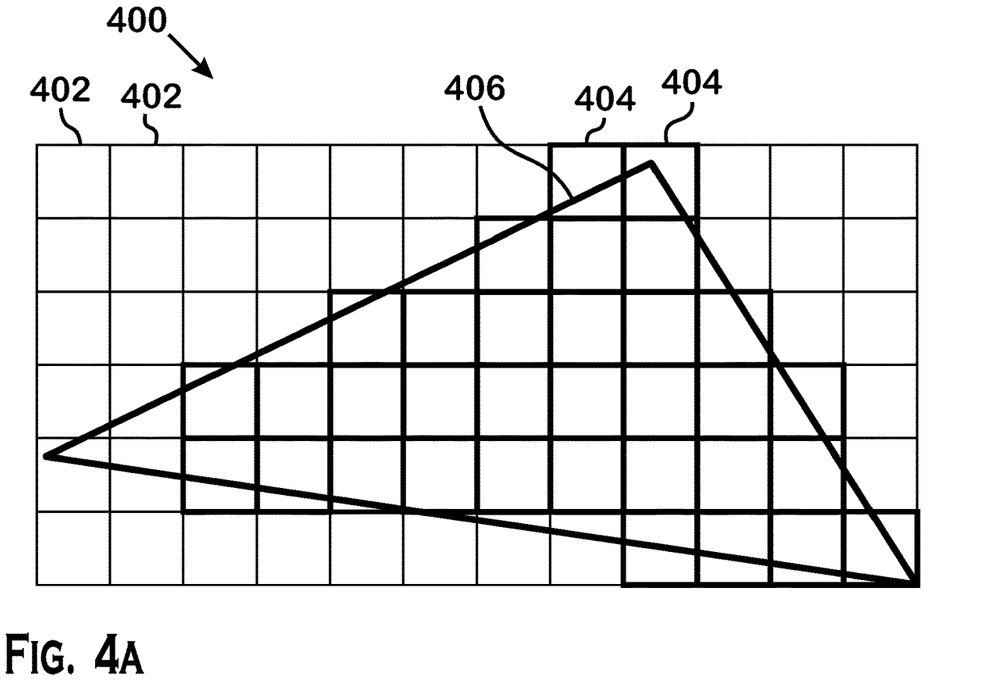
FIG. 4A is an illustration of rendering operations for a triangle, according to an example.

FIG. 4A is an illustration of rendering operations for a triangle 406, according to an example. Several render target pixels 402 are illustrated within the vicinity of the triangle 406. The rasterizer stage 314 determines which of these pixels 402 is covered by the triangle 406 (shown as covered pixels 404) and generates fragments for each such pixel for fragment shading by the pixel shader stage 316. In some examples, the rasterizer stage 314 determines which pixels 402 are covered based on a sample position for the pixel 402. An uncovered sample position 403 is a sample position external to the triangle 406 and a covered sample position 405 is a sample position that is internal to the triangle. Thus a pixel 402 whose sample position is internal to the triangle 406 is considered covered and a pixel whose sample position is external to the triangle 406 is considered not covered. Each work-item executing in the pixel shader stage 316 performs shading operations for one such covered pixel 404.

Figure 4B:
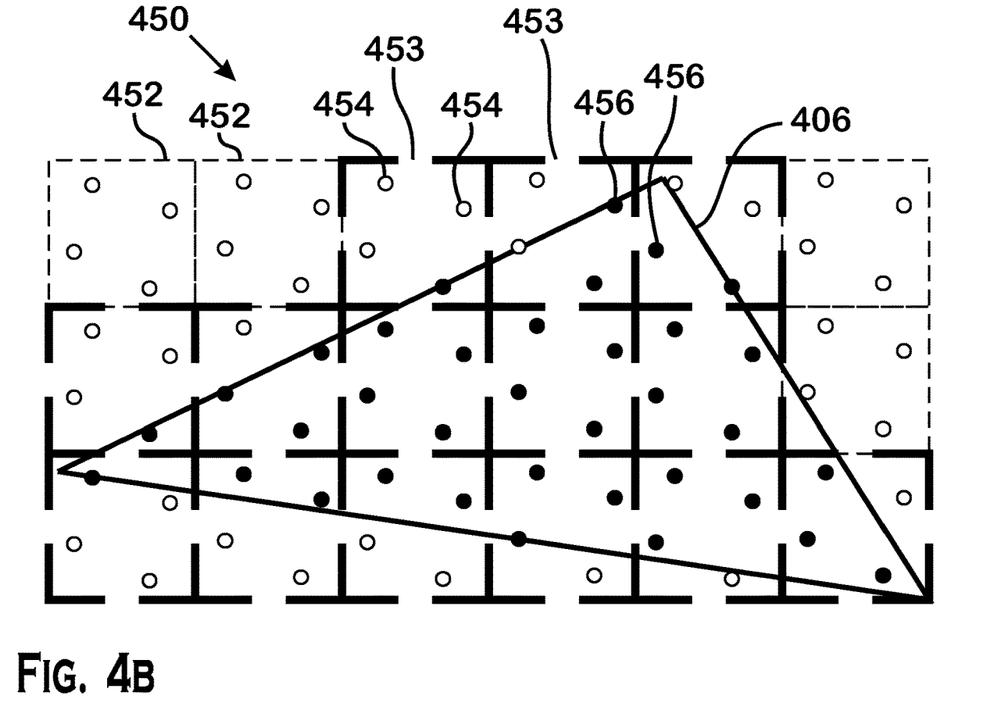
FIG. 4B illustrates rendering operations for variable rate shading ("VRS"), according to an example.

FIG. 4B illustrates rendering operations for variable rate shading, according to an example. In FIG. 4B, the same triangle 406 is shown with several coarse pixels 452. Each coarse pixel 452 is the size of four render target pixels 402. Note that although a specific coarse pixel size is shown (2×2), it is possible for the variable rate shading to perform shading operations for pixels of different shapes and sizes such as 2×1, 1×2, 1×1, or other pixel sizes. Note also that although it is shown in FIG. 4B that the same pixel size is used for a single triangle 406, it is possible for the pixel size and/or shape to vary within a triangle and within a render target.

In FIG. 4B, the rasterizer stage 314 has determined which of the coarse pixels 452 are covered by the triangle 406. The coarse pixels with some coverage are covered coarse pixels 453, and coarse pixels with no coverage are uncovered coarse pixels 452. Each pixel shader work-item determines a color for a single coarse pixel, meaning that in the illustrated example, the pixel shader workload is reduced by approximately a factor of four (although coarse pixels with low coverage will have a smaller reduction due to the fact that such coarse pixels correspond to fewer than four render target pixels).

Each coarse pixel is shown with four samples (covered samples 454 or 456). These samples represent sample positions for pixels in a similar manner as with respect to multi-sampled fragments in a technique that does not use variable rate shading. The samples are illustrated simply for ease of explanation, as the sample positions correspond to the smaller pixel positions of FIG. 4A. However, it should be understood that it is possible for coarse pixels in variable rate shading to have a varying number of samples at varying locations, and that the number of samples for each coarse pixel does not have to equal the number of render target pixels within that coarse pixel. In some modes of operation, the rasterizer stage 314 determines whether coarse pixels are covered and which samples are covered for such coarse pixels. In some modes of operation, the pixel shader determines a single color to apply for each sample of a coarse pixel. In some modes of operation, the output merger stage 318 "expands" the coarse pixels to be stored into the render target buffer (the memory location at which the render target is located). "Expanding" the coarse pixels means converting the coarse pixels into render target pixels according to the size, shape, and position of the coarse pixels. In an example, the output merger stage 318 generates render target pixels for each render target pixel "within" a coarse pixel and combines those render target pixels to the render target. The term "combines" means performs operations, such as a depth test, blending, or other operations, to either discard, overwrite, or blend the render target pixels into the data that is already stored in the render target.

One consideration for variable rate shading ("VRS") is how to determine VRS rates for different portions of the render target. The VRS rate determines how many samples or pixels each work-item executing on the pixel shader stage 316 determines a color for. In an example, in a two-by-two ("2×2") VRS rate, each pixel shader work-item determines a color for four pixels in a two-by-two pixel square. In another example, in a two-by-one ("2×1") VRS rate, each pixel shader work-item determines a color for two pixels in a row. In yet another example, in a one-by-two ("1×2") VRS rate, each pixel shader work item determines a color for two pixels in a column. In a one-by-one VRS rate, each work-item shades a single pixel. It is possible for different portions of the render target to be rendered with different VRS rates.

Figure 5A:
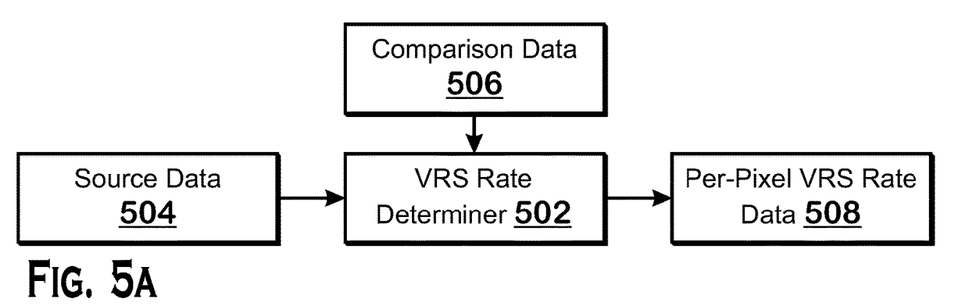
FIGS. 5A and 5B illustrate a technique for determining a VRS rate for pixels of a render target, according to an example.
Figure 5B:
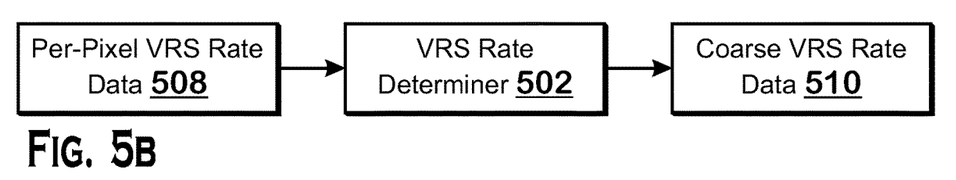

FIGS. 5A and 5B illustrate a technique for determining a VRS rate for pixels of a render target, according to an example. In FIG. 5A, a VRS rate determiner 502 accepts source data 504 and comparison data 506, combines the source data 504 with the comparison data 506, and provides per-pixel VRS rate data 508. The VRS rate determiner 502 is any technically feasible unit. In an example, the VRS rate determiner 502 is or is part of the rasterizer stage 314. In various examples, the VRS rate determiner 502 is hard-wired circuitry, software executing on a processor, or a combination of hard-wired circuitry and software.

In some examples, the source data 504 and comparison data 506 include data of any format. The VRS rate determiner 502 compares the source data 504 and the comparison data 506 to obtain per-pixel VRS rate data 508. In some examples, the source data 504 includes a source value for at least one pixel of a render target. In some examples, the comparison data 506 includes a comparison value for at least one pixel of a render target. In such examples, the comparison operation performed by the VRS rate determiner 502 is performed for each pixel for which a source value is received by the VRS rate determiner 502. The comparison operation compares the source data 504 and comparison data 506 for a pixel and generates a VRS rate for the pixel based on the comparison. Note that although it is sometimes described herein that the comparison operation is performed for each pixel, it should be understood that where pixels include multiple samples, it is possible that the comparison operation occurs per sample. In such examples, the comparison operation is performed for each sample for which a source value is received by the VRS rate determiner 502, but comparing the source data 504 and comparison data 506 for each sample and generating a VRS rate for the sample.

In various examples, any technically feasible comparison function for combining the source data 504 and the comparison data 506 is possible. In various examples, bitwise operations such as OR, XOR, AND, mathematical functions such as subtract, add, maximum, minimum, or any other comparison functions are possible. In these examples, the VRS rate determiner 502 applies the comparison function with the source data 504 and the comparison data 506 as operands to produce the per-pixel VRS rate data 508 as a result. In an example, the VRS rate determiner 502 performs a bitwise OR operation on the source data 504 and the comparison data 506 to obtain a result. In various examples, the source data 504 and the comparison data 506, themselves, specify a VRS rate. The comparison operation determines a resulting VRS rate based on the comparison function on the VRS rate for the source data 504 and the VRS rate for comparison data 506 to generate an output per-pixel VRS rate data 508 for the pixel.

In some examples, the source data 504 is data specified on a per-triangle basis or on a per render target tile basis. An application that requests the graphics processing pipeline 134 to perform rendering work specifies this data to the APD 116. Data specified on a per-triangle basis specifies a VRS rate for a triangle. Data specified on a per render target tile basis specifies a VRS rate for a render target tile. A render target tile is a contiguous set of pixels of the render target.

In some examples, the comparison data 506 is initialized by the application with initial values and includes a VRS rate value for each pixel of the render target. In an example, the initial values are the finest rate (e.g., 1×1) or the coarsest rate (e.g., 2×2 or other coarsest rate). In some examples, the comparison operation, in addition to determining the per-pixel VRS rate data 508 for the pixels in the render target, also updates the comparison data 506. In some implementations, the manner in which the VRS rate determiner 502 updates the comparison data 506 is controllable by the application. In some examples, the VRS rate determiner 502 sets the comparison data 506 for a particular pixel to be equal to the per-pixel VRS rate data 508 determined for that pixel.

In some examples, the VRS rate determiner 502 is a modified stencil test unit that also performs stencil tests. A stencil test is a test that compares an incoming stencil value for a pixel to a stencil value within a stencil buffer for that pixel and determines whether to cull the pixel or to let the pixel be written to the render target, based on the test. In some examples, the comparison data 506 is stored in a stencil buffer. In some examples, if VRS is enabled in the graphics processing pipeline 134, and the stencil buffer is used to determine the VRS rate for some pixels, then stencil operations cannot be performed for those pixels. In another example, the APD 116 includes multiple stencil buffers, one of which is used for the stencil test and one of which is used for VRS rate operations. In such an example, it is possible to both perform the VRS rate determination and the stencil test for the same pixels. In yet another example, stencil data is stored together with VRS rate data in the stencil buffer, with the stencil data occupying some bits of data for a pixel and the VRS rate data occupying other bits of the data. In such examples, VRS rate determination and stencil operations can both be performed on the same data.

Because the VRS rate determination is performed using stencil test hardware in some implementations, in such implementations, an application explicitly indicates that VRS rate data is to be written into a stencil buffer, as the comparison data 506. In some examples, the application also specifies the comparison function, and in some examples, the application also specifies the manner in which the comparison data 506 is to be updated.

FIG. 5B illustrates additional operations for determining VRS rate data for pixels of a render target, according to an example. The VRS rate determiner 502 determines VRS rates for coarse VRS areas based on the per-pixel VRS rate data 508. The coarse VRS areas are collections of render target pixels such as four pixels in a square. In some implementations, the VRS rate determiner 502 determines the VRS rate for each coarse VRS area as the finest covered VRS rate for that coarse VRS area. The "finest" VRS rate means the lowest ratio of pixels to work-items. In an example, if at least one pixel indicates a VRS rate of 1×1, then the VRS rate for the coarse VRS area is 1×1. If no pixels indicate a VRS rate of 1×1 and at least one pixel indicates a VRS rate of 2×1, then the rate is 2×1. If all pixels indicate a VRS rate of 2×2, then the VRS rate for the coarse VRS area is 2×2. In some examples, it is possible to have a sub-pixel VRS rate, meaning that multiple colors are generated per pixel, for different samples of the pixel. In such examples, it is possible for the finest VRS rate to be a multiple-sample shading rate.

Figure 6:
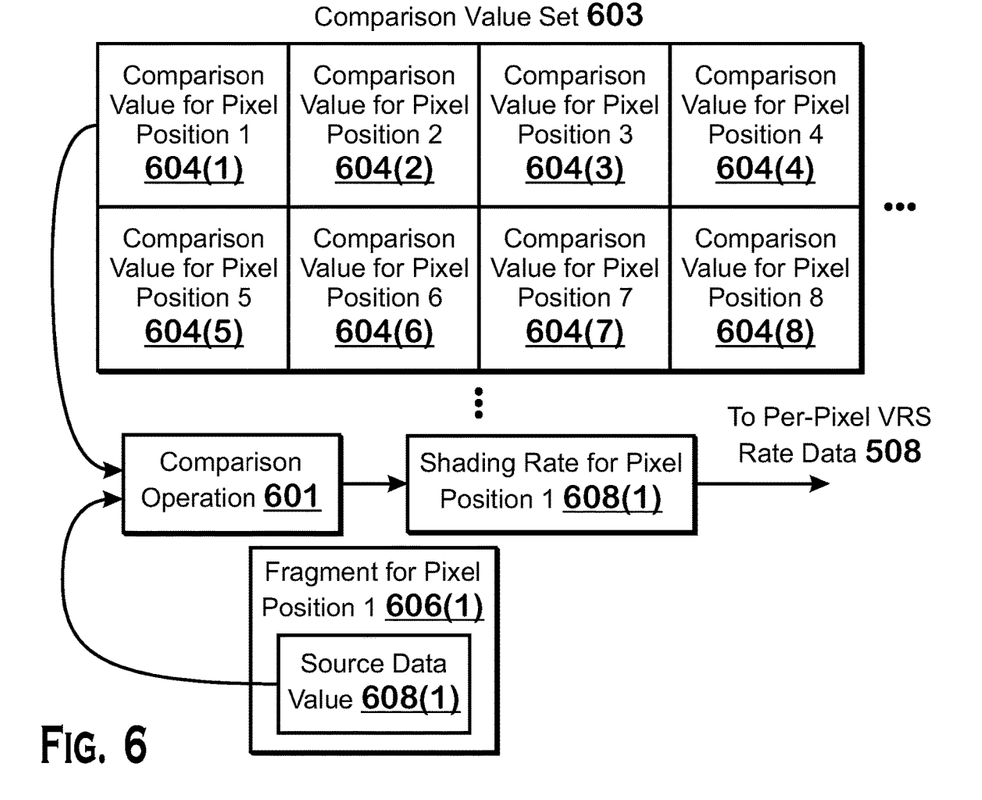
FIG. 6 illustrates a comparison operation for generating per-pixel VRS rate data, according to an example.

FIG. 6 illustrates a comparison operation for generating per-pixel VRS rate data 508, according to an example. The VRS rate determiner 502 performs the comparison operation 601, comparing a comparison value 604 for a particular pixel position to a fragment source data value 608 for a fragment at that particular pixel position. The fragment source data value 608 corresponds to the source data 504 of FIG. 5A.

The comparison operation 601 involves receiving a fragment for a particular pixel position in the render target, where the fragment includes a source data value 608. The comparison operation 601 also involves identifying, within the comparison value set 603, identifying the comparison value 604 within the comparison value set 603 that corresponds to the pixel position of the fragment 606. The comparison operation 601 includes performing a comparison function on the source data value 608 and the comparison value 604 to generate a shading rate for the fragment at the pixel position 608. In some examples, the comparison value set 603 is or is part of the stencil buffer.

Figure 7:
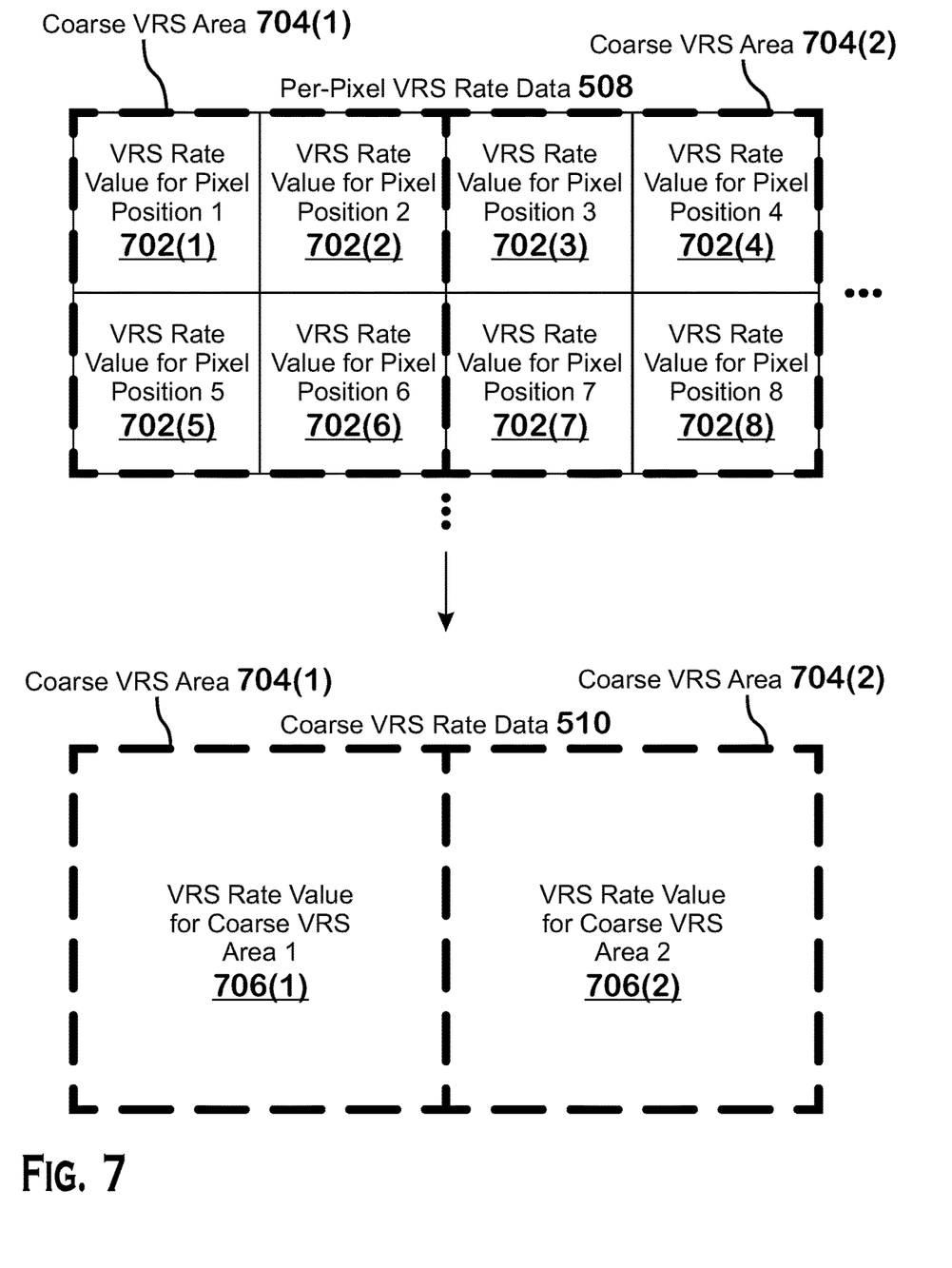
FIG. 7 illustrates operations for generating coarse VRS rate data from per-pixel VRS rate data, according to an example.

FIG. 7 illustrates operations for generating coarse VRS rate data 510 from per-pixel VRS rate data 508, according to an example. In this example, the VRS rate determiner 502 examines the per-pixel data 702 for multiple fragments within coarse VRS areas 704 and determines a VRS rate value 706 for the coarse VRS area 704. The pixels shader stage 316 subsequently shades the pixels within the coarse VRS areas 704 according to the determined VRS rate. For example, if the rate is 2×1, then each work-item of the pixel shader stage 316 determines a single color for two render target pixels.

In some implementations, the VRS rate determiner 502 considers each of the VRS rates 702 for fragments within a coarse VRS area 704 and selects, for that coarse VRS area 704, the finest VRS rate. A first VRS rate is finer than a second VRS rate in the event that the first VRS rate indicates a smaller number of pixels per pixel shader work-item. In other words, a finer VRS rate is a lower ratio between work-items and render target pixels.

In some implementations, the VRS rate determiner 502 is or is part of the rasterization stage 314. As described elsewhere herein, the rasterization stage 314 determines coverage for triangles to generate fragments. More specifically, the rasterization stage 314 receives triangles from upstream in the graphics processing pipeline 134 and "scans" through the triangles, determining which render target pixels (and/or samples) are covered by the triangles. For each such covered pixel, the rasterization stage 314 generates a fragment to be processed by the remainder of the graphics processing pipeline 134. In some implementations, the rasterization stage 314 generates and buffers fragments for a coarse VRS area 704 and then determines the shading rate for those fragments within the coarse VRS area 704 as described. Subsequently, the rasterization stage 314 transmits those fragments with the VRS rate data to the pixel shader stage 316 for shading at the determined VRS rate. In some examples, the rasterizer stage 314 generates "coarse fragments" at the determined VRS rate for shading by the pixel shader stage 316. A coarse fragment is a fragment that corresponds to the pixel size of the determined VRS rate. For a 2×2 VRS rate, a single coarse fragment is generated for four original fragments (e.g., for four render target pixels). For a 2×1 VRS rate or a 1×2 VRS rate, a single coarse fragment is generated for two original fragments.

Figure 8:
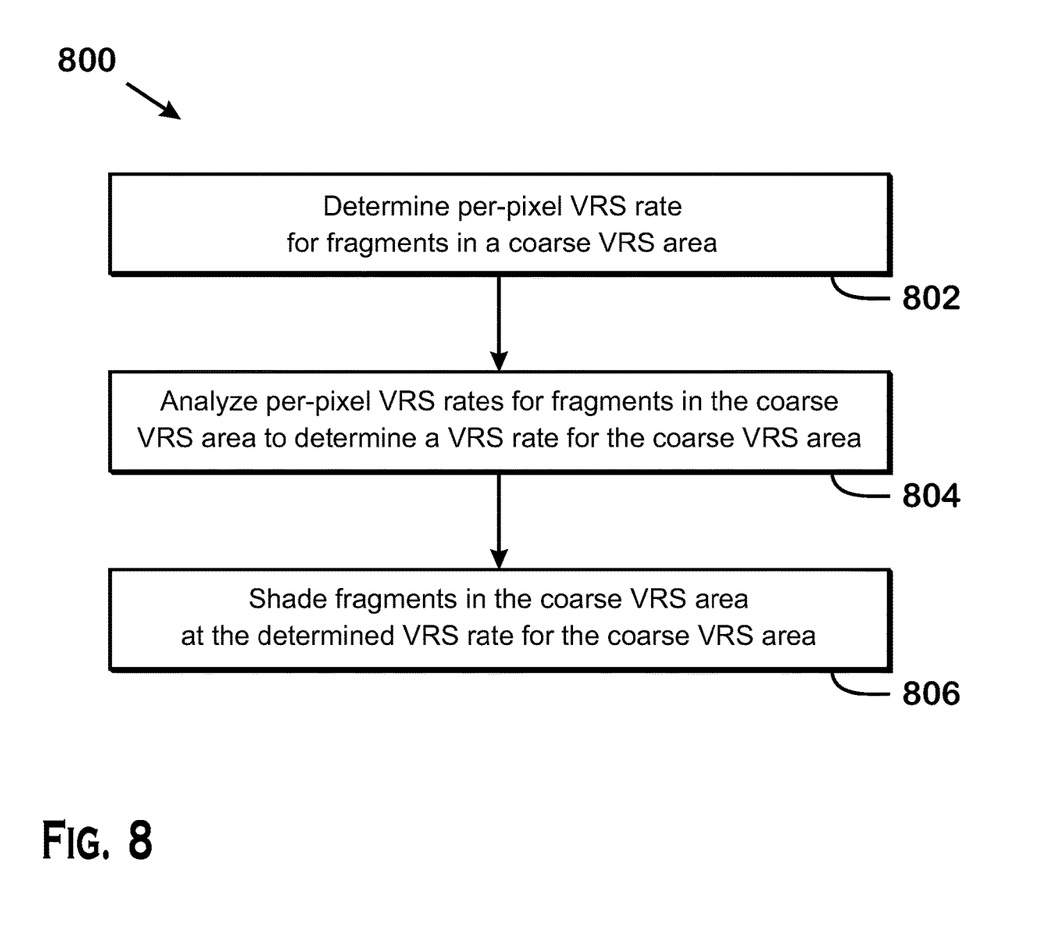
FIG. 8 illustrates a method for performing operations for variable rate shading, according to an example.

FIG. 8 illustrates a method 800 for performing operations for variable rate shading, according to an example. Although described with respect to the system of FIGS. 1-7, those of skill in the art will understand that any system configured to perform the steps of the method 800 in any technically feasible order falls within the scope of the present description.

At step 802, a VRS rate determiner 502 determines per-pixel VRS rates for fragments in a coarse VRS area 704. The per-pixel VRS rates include VRS rates for each fragment within the coarse VRS area 704. More specifically, as described elsewhere herein, the render target includes a number of pixels. The coarse VRS area 704 corresponds to the area of multiple such pixels (for example, a 2×2 area of pixels). In some examples, the fragments for which the per-pixel VRS rates are determined are fragments generated by the rasterizer stage 314. In some examples, the rasterizer stage 314 rasterizes a triangle and identifies render target pixels that are covered by the triangle. The VRS rate determine 502 generates a fragment for each such covered pixel. The VRS rate determiner 502 determines a per-pixel VRS rate for each such fragment.

In some examples, the VRS rate determiner 502 determines the per-pixel VRS rate in the following manner. The VRS rate determiner 502 identifies a comparison value for a fragment, as well as a source value for the fragment. The comparison value is a value stored in a buffer (e.g., comparison value set 603) that stores comparison values for the pixels of the render target. In some examples, the buffer is a stencil buffer. In some examples, the comparison values are stored alone in the stencil buffer, instead of stencil values. In other examples, the comparison values are stored together with stencil values. In such examples, within the stencil buffer, each data item corresponds to a particular render target pixel and includes some bits for the stencil test and some bits for the VRS rate determination. In such examples, the stencil test unit is capable of performing stencil tests with the stencil data in the stencil buffer and the VRS rate determiner 502 is capable of performing VRS rate determination with the VRS rate data in the stencil buffer. In some examples, an application sets the values in the buffer. In some examples, VRS rate determination operations update the value as the rate determinations are made. In some examples, the source value for the fragment is obtained from the fragment itself or from the data from which the fragment is derived. In some examples, the triangle from which the fragment is generated includes a VRS rate source value. In other examples, the source value for the fragment comes from a tile-based VRS rate map. The tile-based VRS rate map stores VRS rates on a screen tile basis. Any other technically feasible way to determine source values for fragments are possible.

In some examples, determining the per-pixel VRS rates includes performing a comparison function on the comparison value and the source value. In some examples, the comparison operation compares a comparison value for a render target pixel position to a source value for the same render target pixel position. Examples of the comparison functions are provided elsewhere herein.

At step 804, the VRS rate determiner 502 analyzes the per-pixel VRS rates for fragments in the coarse VRS area to determine a VRS rate for the coarse VRS area. In some examples, the VRS rate determiner 502 determines, as the VRS rate, the finest VRS rate of all the per-pixel VRS rates in the coarse VRS area.

In some examples, step 804 is performed using the fragments generated by the rasterizer stage 314. Specifically, the rasterizer stage generates fragments that are stored in a buffer that stores at least enough fragments to fill up a coarse VRS area. The VRS rate determiner 502 examines the fragments in this buffer, each of which has an associated per-pixel VRS rate (step 802), and selects the finest of these rates as the VRS rate for the coarse VRS area.

As an alternative to step 804, or in addition to step 804, in some modes of operation, the VRS rate determiner 502 determines a sub-pixel VRS rate from the per-pixel VRS rate for fragments in the coarse VRS area. In some such examples, the VRS rate determiner 502 obtains this information from a subset of bits of the per-pixel VRS rate. In the situation that a per-pixel VRS rate indicates a multi-sample VRS rate, the VRS rate determiner 502 indicates to the pixel shader stage 316 that at least one of the fragments, but not necessarily all of the fragments in the coarse VRS area, is to be shaded at a multi-sample shading rate. In such examples, it is possible for each work-item executing in the pixel shader stage 316 to determine a color for a different sample within a fragment.

At step 806, the pixels shader stage 316 shades fragments in the coarse VRS area at the rate determined for the coarse VRS area. In some examples, the rasterizer stage 314 generates "coarse fragments" based on the VRS rate described above, and the pixel shader stage 316 shades these coarse fragments. More specifically, although the rasterizer stage 314 obtains the fine fragments initially, upon determining the VRS rate, the rasterizer stage 314 generates and outputs coarse fragments based on the VRS rate. The coarse fragments are sized according to the VRS rate. For example, in the situation that the rate is determined to be 2×2, and the buffer in which the fine fragments are stored is 2×2 in size, the rasterizer stage 314 generates one fragment for these four fine fragments. The pixel shader stage 316 shades this one fragment instead of the four fine fragments.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the APD 116, the APD scheduler 136, the graphics processing pipeline 134, the compute units 132, the SIMD units 138, each stage of the graphics processing pipeline 134 illustrated in FIG. 3, and the VRS rate determiner 502) may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   determining a coarse variable shading rate for a coarse variable rate shading area based on a plurality of per-pixel variable rate shading rates associated with a plurality of fragments, wherein each of the plurality of the per-pixel variable rate shading rates is generated by comparing a variable rate shading comparison value for an associated fragment with a source value for the associated fragment, wherein the variable rate shading comparison value that is not stencil data is stored in a stencil buffer; and
   shading one or more fragments based on the plurality of fragments and based on the coarse variable shading rate.

2. The method of claim 1, wherein the variable rate shading comparison value is supplied by an application.

3. The method of claim 1, wherein the stencil buffer stores data for stencil test operations.

4. The method of claim 1, wherein the source value is determined from a triangle from which the associated fragment is generated.

5. The method of claim 1, wherein determining the coarse variable shading rate includes determining, as the coarse variable shading rate, a finest variable shading rate of the plurality of per-pixel variable rate shading rates.

6. The method of claim 1, wherein shading the one or more fragments includes generating one or more coarse fragments from the plurality of fragments based on the coarse variable shading rate.

7. The method of claim 6, wherein shading the one or more fragments includes shading the one or more coarse fragments.

8. A system, comprising:
   a VRS rate determiner configured to:
      determine a coarse variable shading rate for a coarse variable rate shading area based on a plurality of per-pixel variable rate shading rates associated with a plurality of fragments, wherein each of the plurality of the per-pixel variable rate shading rates is generated by comparing a variable rate shading comparison value for the associated fragment with a source value for an associated fragment, wherein the variable rate shading comparison value that is not stencil data is stored in a stencil buffer; and
   a pixel shader stage configured to shade one or more fragments based on the plurality of fragments and based on the coarse variable shading rate.

9. The system of claim 8, wherein the variable rate shading comparison value is supplied by an application.

10. The system of claim 8, wherein the stencil buffer stores data for stencil test operations.

11. The system of claim 8, wherein determining the coarse variable shading rate includes determining, as the coarse variable shading rate, a finest variable shading rate of the plurality of per-pixel variable rate shading rates.

12. The system of claim 8, wherein shading the one or more fragments includes generating one or more coarse fragments from the plurality of fragments based on the coarse variable shading rate.

13. The system of claim 12, wherein shading the one or more fragments includes shading the one or more coarse fragments.

14. A non-transitory computer-readable medium storing instructions that, when executed by a processor, cause the processor to:
   determine a coarse variable shading rate for a coarse variable rate shading area based on a plurality of per-pixel variable rate shading rates associated with a plurality of fragments, wherein each of the plurality of the per-pixel variable rate shading rates is generated by comparing a variable rate shading comparison value for an associated fragment with a source value for an associated fragment, wherein the variable rate shading comparison value that is not stencil data is stored in a stencil buffer; and
   shade one or more fragments based on the plurality of fragments and based on the coarse variable shading rate.

15. The non-transitory computer-readable medium of claim 14, wherein the variable rate shading comparison value is supplied by an application.

16. The non-transitory computer-readable medium of claim 14, wherein the stencil buffer stores data for stencil test operations.

17. The non-transitory computer-readable medium of claim 14, wherein the source value is determined from a triangle from which the associated fragment is generated.

18. The non-transitory computer-readable medium of claim 14, wherein determining the coarse variable shading rate includes determining, as the coarse variable shading rate, a finest variable shading rate of the plurality of per-pixel variable rate shading rates.

19. The non-transitory computer-readable medium of claim 14, wherein shading one or more fragments includes generating one or more coarse fragments from the plurality of fragments based on the coarse variable shading rate.

20. The non-transitory computer-readable medium of claim 19, wherein shading the one or more fragments includes shading the one or more coarse fragments.

\* \* \* \* \*